US012506249B2

(12) United States Patent
Singhvi et al.

(10) Patent No.: US 12,506,249 B2
(45) Date of Patent: Dec. 23, 2025

(54) WIDEBAND INTERNET-OF-THINGS ANTENNA

(71) Applicant: Honeywell International Inc., Charlotte, NC (US)

(72) Inventors: Shalu Singhvi, Hyderabad (IN); Steven Osborne, Nottingham (GB)

(73) Assignee: Honeywell International Inc., Charlotte, NC (US)

( * ) Notice: Subject to any disclaimer, the term of this patent is extended or adjusted under 35 U.S.C. 154(b) by 151 days.

(21) Appl. No.: 18/244,245

(22) Filed: Sep. 9, 2023

(65) Prior Publication Data

US 2025/0087882 A1 Mar. 13, 2025

(51) Int. Cl.
*H01Q 1/22* (2006.01)
*H01Q 1/12* (2006.01)

(52) U.S. Cl.
CPC ......... *H01Q 1/2233* (2013.01); *H01Q 1/1207* (2013.01)

(58) Field of Classification Search
CPC ........................... H01Q 1/1207; H01Q 1/2233
See application file for complete search history.

(56) References Cited

U.S. PATENT DOCUMENTS

| | | | | |
|---|---|---|---|---|
| 7,710,332 | B2 | 5/2010 | Chen et al. | |
| 8,723,750 | B2 | 5/2014 | Podduturi | |
| 9,093,744 | B2 | 7/2015 | Seal et al. | |
| 10,164,320 | B1 | 12/2018 | Stuyvenberg et al. | |
| 10,468,769 | B2 | 11/2019 | Ahn et al. | |
| 11,119,133 | B2 | 9/2021 | Bonicatto et al. | |
| 11,184,868 | B2 | 11/2021 | Su et al. | |
| 2015/0357714 | A1* | 12/2015 | Ng | H01Q 1/3275 343/848 |
| 2017/0003142 | A1* | 1/2017 | Allcorn | H04Q 9/00 |
| 2017/0324167 | A1* | 11/2017 | Ng | H01Q 1/38 |

(Continued)

FOREIGN PATENT DOCUMENTS

| | | | |
|---|---|---|---|
| CN | 112332076 | A | 2/2021 |
| EP | 1733453 | A1 | 12/2006 |

OTHER PUBLICATIONS

Collins Burton Mwakwata, Hassan Malik, Muhammad Mahtab Alam, Yannick Le Moullec, Sven Parand and Shahid Mumtaz, "Narrowband Internet of Things (NB-IoT): From Physical (PHY) and Media Access Control (MAC) Layers Perspectives", Sensors 2019, 19 2613; doi: 10.3390/s19112613, www.mdpi.com/journal/sensors.

(Continued)

*Primary Examiner* — Daniel Munoz
(74) *Attorney, Agent, or Firm* — KPPB Law; Luis M. Ortiz; Kermit D. Lopez

(57) ABSTRACT

A wideband antenna apparatus can include a ground plane on a printed circuit board, and a plastic substrate that can support an antenna metal structure of an antenna. The antenna can be part of an antenna assembly that can connect to the printed circuit board. The wideband antenna apparatus may further include a metal radiating element mounted to the plastic substrate with heat staking, and a feeder leg electrically connected to an RF feeder port. The antenna can be connected directly to the RF feeder port and the plastic substrate can control variations in the radiation performance of the antenna due to, for example, manufacturing variations.

18 Claims, 4 Drawing Sheets

(56) References Cited

U.S. PATENT DOCUMENTS

2022/0416430 A1 12/2022 Patton et al.

OTHER PUBLICATIONS

Y.-P. Eric Wang, et al., "A Primer on 3GPP Narrowband Internet of Things (NB IoT)".
S. Popli et al., "A Survey on Energy Efficient Narrowband Internet of Things (NBIoT): Architecture, Application and Challenges", vol. 7, 2019, IEEE Access.
"Staking (manufacturing)", Wikipedia, Retrieved from "https://en.wikipedia.org/w/index.php?title=Staking_(manufacturing)&oldid=882010456", downloaded Aug. 11, 2023.
"Narrowband Internet of Things," Whitepaper, www.rohde-schwarz.com/appnote/ 1MA266.
European Patent Application No. 24195554.1-1201, Extended Search Report, Feb. 3, 2025.

* cited by examiner

WIDEBAND INTERNET-OF-THINGS ANTENNA

TECHNICAL FIELD

Embodiments are generally related to wireless communications technologies. Embodiments further relate to lower power wide area network (LPWAN) systems and battery-powered communications devices used in such systems. Embodiments also relate to narrowband internet-of-things (NBIoT) communications devices including, but not limited to gas and water meters used in utility metering applications.

BACKGROUND

Long term evolution (LTE) CAT NB1 is emerging as a go-to lower power wide area network (LPWAN) option for battery powered devices such as gas and water meters due to its wide coverage, reliability and secure communications, and low battery consumption. Water meters with narrowband internet-of-things (NBIoT) as a communication technology, needs to support multiple frequency bands depending on the network provider (carrier) and geography.

A total of 6 Frequency bands must be supported to ensure NBIoT wireless connectivity everywhere it is available. For example, a minimum 18 dBm TRP may be required for all 6 frequency bands [e.g., (B1 (2100), B3 (1800), B5(850), B8(900), B20(800), B28(700)] to ensure wireless connection efficiency and reliability even for the low network coverage locations.

It is difficult to achieve the required antenna radiation performance for 700-2100 MHz wideband frequencies, given the size constraint of water meter approximately 80×34 mm (L×W). Water meter electronics are generally encapsulated or potted to protect from harsh environment, which poses further challenges to achieve the required radiation performance.

Antenna performance varies in mass manufacturing due to variation in antenna metal structure during assembly. Furthermore, antenna RF connector performance can degrade under potting material used in the assembly of an antenna device.

BRIEF SUMMARY

The following summary is provided to facilitate an understanding of some of the features of the disclosed embodiments and is not intended to be a full description. A full appreciation of the various aspects of the embodiments disclosed herein can be gained by taking the specification, claims, drawings, and abstract as a whole.

It is, therefore, one aspect of the embodiments to provide for improved wireless communications technologies.

It is another aspect of the embodiments to provide for improved communications devices for use in lower power wide area network (LPWAN) systems.

It is a further aspect of the embodiments to provide for narrowband internet-of-things (NBIoT) communications devices including, but not limited to gas and water meters and other types of metering devices and systems used in utility metering applications.

It is an additional aspect of the embodiments to provide for a wideband antenna apparatus.

The aforementioned aspects and other objectives can now be achieved as described herein. In an embodiment, a wideband antenna apparatus can include a ground plane on a printed circuit board, and a plastic substrate that can support an antenna metal structure of an antenna. The antenna can be part of an antenna assembly that can connect to the printed circuit board. The wideband antenna apparatus may further include a metal radiating element mounted to the plastic substrate with heat staking, and a feeder leg electrically connected to an RF feeder port. The antenna can be connected directly to the RF feeder port and the plastic substrate can control variations in the radiation performance of the antenna due to, for example, manufacturing variations.

In an embodiment, the plastic substrate can comprise one or more of, for example, polycarbonate (PC) and acrylonitrile butadiene styrene (ABS).

In an embodiment, the antenna can be directly soldered to the RF feeder port to eliminate RF connector performance issues with respect to a potting material used to protect the RF connector from harsh environment and facility ease of assembly of the wideband antenna apparatus.

In an embodiment, the antenna can be partially potted to protect electronics from a harsh environment while enhancing a radiation performance with respect to the antenna.

In an embodiment, the antenna can include a compact-sized antenna metal structure that can achieve approximately 18 dBm Total Radiated Power radiation performance for wideband NBIOT (narrowband Internet-of-Things) frequencies.

In an embodiment, the wideband NBIOT frequencies can include frequencies in a range of approximately 700 MHz to 2100 MHz, covering NBIOT bands B1, B3, B5, B8, B20.

In an embodiment, the antenna can be an LTE Internet-of-Things antenna.

In an embodiment, a wideband antenna apparatus can include: a plastic substrate that can support an antenna metal structure of an antenna, wherein the antenna is part of an antenna assembly; a metal radiating element mounted to the plastic substrate with heat staking; and a feeder leg electrically connected to an RF feeder port, wherein the antenna can be connected directly to the RF feeder port and the plastic substrate controls variations in a radiation performance of the antenna due to manufacturing variations.

In an embodiment, a method of operating a wideband antenna apparatus, can involve controlling with a plastic substrate, variations in a radiation performance of an antenna. The plastic substrate can support an antenna metal structure that includes the antenna. The antenna can be part of an antenna assembly and a metal radiating element can be mounted to the plastic substrate with heat staking. In this method, a feeder leg can be electrically connected to an RF feeder port, and the antenna can be connected directly to the RF feeder port. The antenna can be directly soldered to the RF feeder port to eliminate RF connector performance issues with respect to a potting material used to protect the RF connector from harsh environment and facility ease of assembly of the wideband antenna apparatus. In this method, the antenna can be a compact-sized antenna metal structure that achieves approximately 18 dBm Total Radiated Power radiation performance for wideband NBIOT (narrowband Internet-of-Things) frequencies. The antenna may be an LTE Internet-of-Things antenna.

BRIEF DESCRIPTION OF THE DRAWINGS

The accompanying figures, in which like reference numerals refer to identical or functionally similar elements throughout the separate views and which are incorporated in and form a part of the specification, further illustrate the present invention and, together with the detailed description of the invention, serve to explain the principles of the present invention.

Identical or similar parts or elements in the figures may be indicated by the same reference numerals.

DETAILED DESCRIPTION

Figure 1:
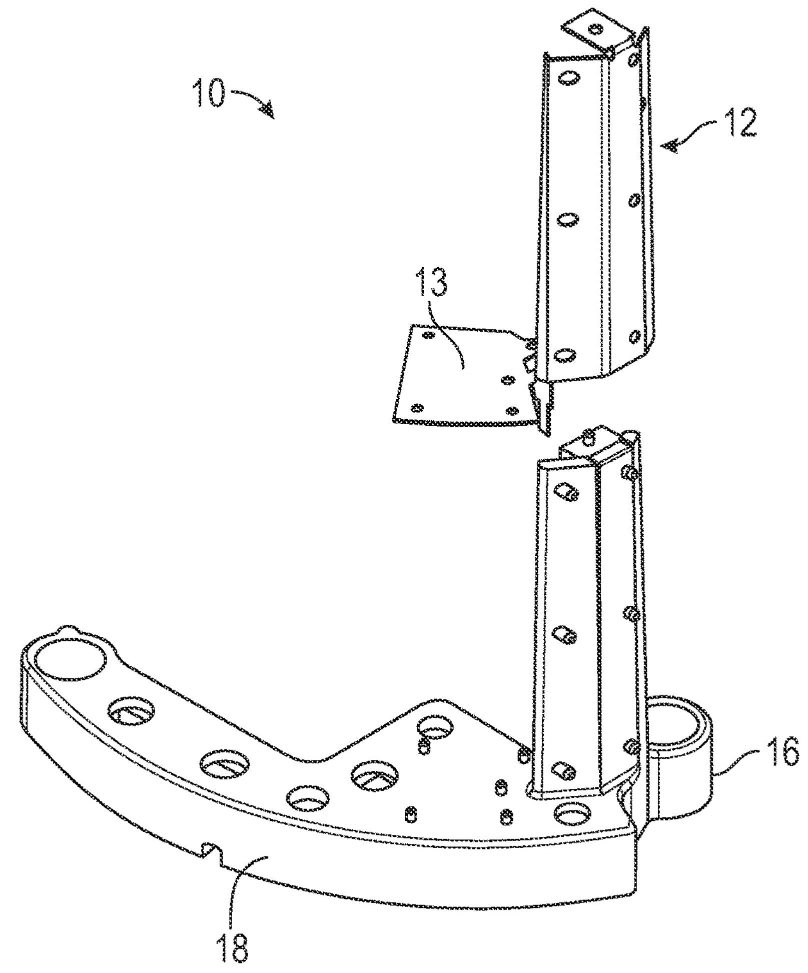
FIG. 1 illustrates a perspective view of an antenna assembly, which can be implemented in accordance with an embodiment.

The particular values and configurations discussed in these non-limiting examples can be varied and are cited merely to illustrate one or more embodiments and are not intended to limit the scope thereof.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other issues, subject matter may be embodied as methods, devices, components, or systems. Accordingly, embodiments may, for example, take the form of hardware, software, firmware, or a combination thereof. The following detailed description is, therefore, not intended to be interpreted in a limiting sense.

Throughout the specification and claims, terms may have nuanced meanings suggested or implied in context beyond an explicitly stated meaning. Likewise, phrases such as "in an embodiment" or "in one embodiment" or "in an example embodiment" and variations thereof as utilized herein may or may not necessarily refer to the same embodiment and the phrase "in another embodiment" or "in another example embodiment" and variations thereof as utilized herein may or may not necessarily refer to a different embodiment. It is intended, for example, that claimed subject matter include combinations of example embodiments in whole or in part.

In general, terminology may be understood, at least in part, from usage in context. For example, terms such as "and," "or," or "and/or" as used herein may include a variety of meanings that may depend, at least in part, upon the context in which such terms are used. Generally, "or" if used to associate a list, such as A, B, or C, is intended to mean A, B, and C, here used in the inclusive sense, as well as A, B, or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms such as "a," "an," or "the", again, may be understood to convey a singular usage or to convey a plural usage, depending at least in part upon context. Furthermore, the term "at least one" as used herein, may refer to "one or more." For example, "at least one widget" may refer to "one or more widgets."

In addition, the term "based on" may be understood as not necessarily intended to convey an exclusive set of factors and may, instead, allow for existence of additional factors not necessarily expressly described, again, depending at least in part on context.

FIG. 1 illustrates a perspective view of an antenna assembly 10, which can be implemented in accordance with an embodiment. The antenna assembly 10 shown in FIG. 1 can be implemented as part of a wideband antenna apparatus such as the wideband apparatus 30 shown in FIG. 6, FIG. 7, and FIG. 8 herein. The antenna assembly 10 can include an antenna 12 which is associated with a plate 13 that can be implemented as a metal stamped radiating part. Note that the antenna 12 and plate 13 are both part of a single metal stamped antenna. This unique metal structure can be designed to achieve wideband (e.g., 700 MHz-2100 MHz) performance.

Note that the antenna 12 may be formed as a metal antenna and the plate 13 can also be formed from a metal. An antenna support 18 may be curved shaped in some embodiments and can include a circular shaped protruding portion 16. The antenna support 18 may be formed from a polymer material. The antenna support 18 may be implemented as a plastic substrate that supports the antenna metal structure of the antenna 12 including the plate 13. It should be appreciated that the curved shaped of the antenna support 18 is not a limiting feature of the embodiments. Other shapes can be implemented in other embodiments.

Figure 2:
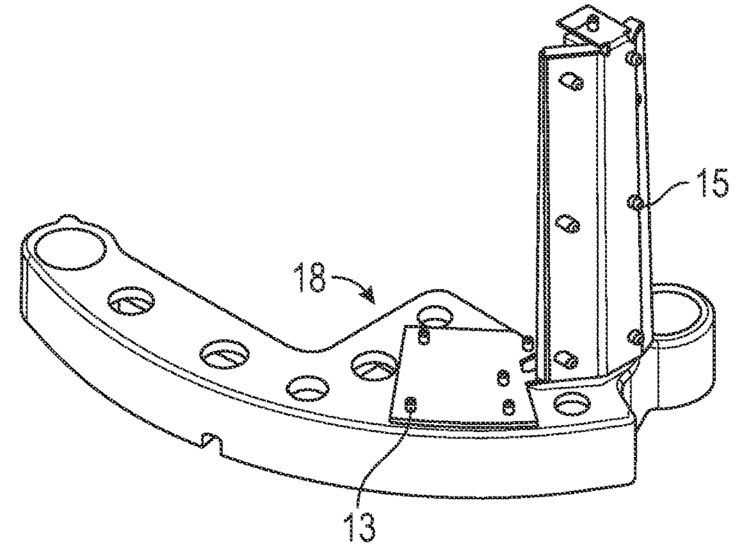
FIG. 2 illustrates a perspective view of the antenna assembly shown in FIG. 1 but with the antenna secured in a supporting configuration with one or more heat stake pins, in accordance with an embodiment.

FIG. 2 illustrates a perspective view of the antenna assembly 10 shown in FIG. 1 but with the antenna 12 secured in a supporting configuration with one or more heat stake pins such as heat stake pins 13, 15, in accordance with an embodiment. It should be appreciated that although heat stake pins 13, 15 are identified in FIG. 2 by specific reference numerals, additional heat stake pins may be implemented as needed. The antenna 12 can be secured to the support 18 via heat stake pins 13, 15 and/or via other heat stake pins.

Note that the use of such heat stake pins 13, 15 involves so-called heat staking, which relates to a process of connecting two components by creating an interference fit between the two pieces. One workpiece may have a hole in it while the other may have a boss that fits within the hole. The boss can be very slightly undersized so that it can form a flip fit. A staking punch may be then used to expand the boss radially and to compress the boss axially so as to form an interference fit between the workpieces. This can form a permanent joint. Heat staking may also relate to thermoplastic staking, which is the same process essentially as staking except that is used heat to deform a plastic boss, instead of cold forming. A plastic stub can protrude from one component can fit into a hole in the second component. The stud can be then deformed through softening of plastic to form a head which can mechanically lock the two components together. This is a versatile technique benefiting from being quick, economical and consistent. Unlike welding techniques, staking has the capacity to join plastics to other materials (e.g., metal, printed circuit boards) in addition to joining like or dissimilar plastics, and it has the advantage over other mechanical joining methods in eliminating the need for consumables such as, for examples, rivets and screws.

Figure 3:
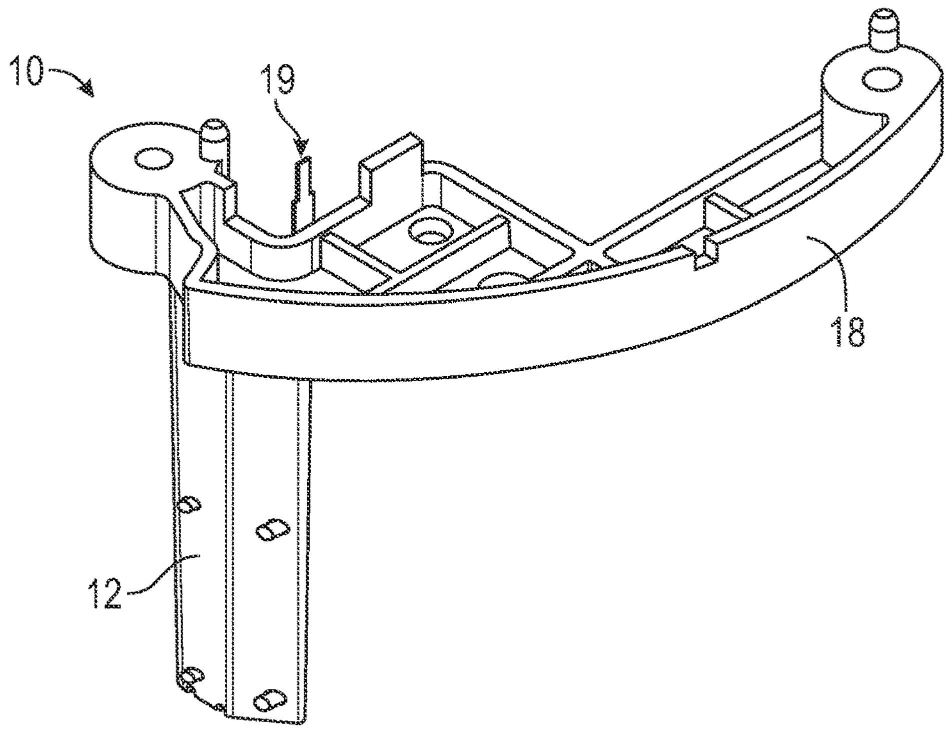
FIG. 3 illustrates a reversed perspective view of the antenna assembly, in accordance with an embodiment.

FIG. 3 illustrates a reversed perspective view of the antenna assembly 10, in accordance with an embodiment. In the arrangement shown in FIG. 3, a feeder leg 19 is shown, which may be a connection/solder leg with respect to printed circuit board such as a PCBA (e.g., see the printed circuit board 22 shown in FIG. 4). The feeder leg 19 can be electrically connected to an RF feeder port, wherein the antenna 12 can be connected directly to the RF feeder port and the plastic substrate or polymer antenna support 18 can control variations in the radiation performance of the antenna 12 due to, for example. manufacturing variations.

Figure 4:
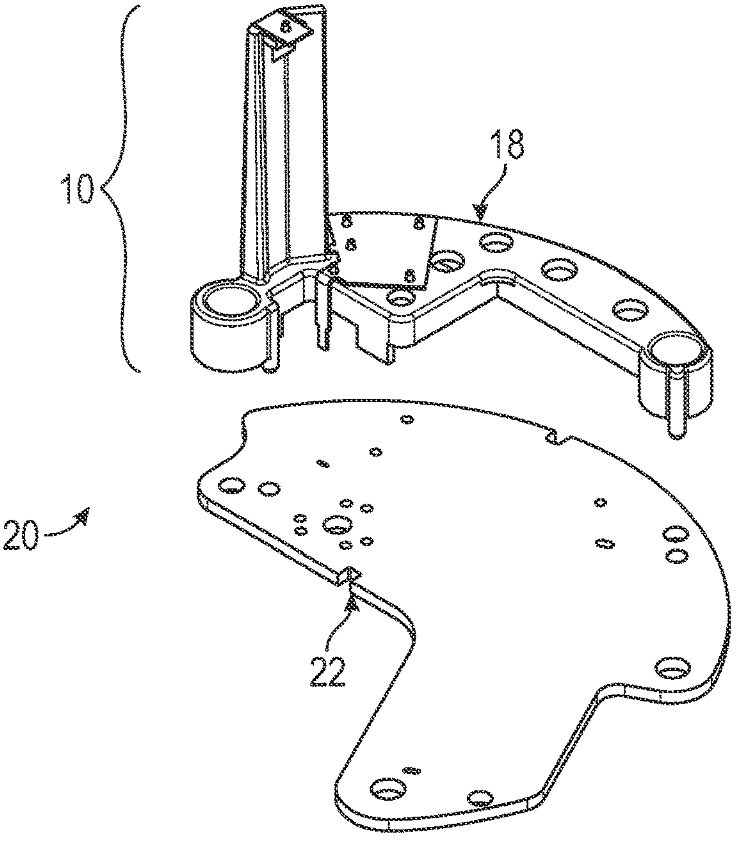
FIG. 4 illustrates a perspective view of an antenna configuration including an antenna assembly with respect to a printed circuit board (PCB), in accordance with an embodiment.

FIG. 4 illustrates a perspective view of an antenna configuration 20 including the antenna assembly 10 with respect to a printed circuit board (PCB) 22, in accordance with an embodiment. The view shown in FIG. 4 depicts the antenna configuration 20 prior to the connection of the antenna assembly 10 to the printed circuit 22. Note that the printed circuit board 22 may be a printed circuit board assembly (PCBA), which can be a finished board after all the components have been soldered and installed on a printed circuit board (PCB). The conductive pathways engraved in the laminated copper sheets of PCBs may be used within a non-conductive substrate, for example, in order to form the assembly.

The printed circuit board 22 may be implemented as a ground plane on a printed circuit board. The term 'ground plane on a printed circuit board' as utilized herein can relate to a continuous and typically solid layer of copper or other conductive material that can be integrated into the PCB's design. This can serve as a reference point for electrical signals and components on the PCB. The ground plane is usually located on one of the internal layers of the PCB, though it can also be placed on the outer layers.

A primary purpose of a ground plane is to provide a low-impedance return path for electric currents. This helps in minimizing electromagnetic interference (EMI), noise, and signal distortions in the circuit. The ground plane acts as a "virtual ground" that is maintained at a stable voltage level, providing a common reference point for the entire circuit.

Key benefits of using a ground plane on a PCB include, for example, reduced signal noise, wherein the ground plane can act as a shield, minimizing the coupling of electromagnetic fields between different components and traces on the PCB. This can reduce the likelihood of signal interference and noise. Having a solid ground plane also helps to maintain a consistent ground reference level across the entire PCB, which can be crucial for accurate signal transmission and reception. Such a ground plane can also simplify the routing process since there is no need to allocate separate traces for a ground connection. This can lead to a more organized and efficient PCB layout.

The large area of a ground plane can also help with heat dissipation, particularly in circuits with components that generate heat during operation. In addition, the ground plane's shielding effect can assist in complying with electromagnetic compatibility (EMC) requirements by minimizing emissions and susceptibility to external interference. While the ground plane is primarily associated with providing a stable ground reference, it is important to consider its placement and layout carefully, as improper design can lead to unintended consequences such as parasitic capacitance and crosstalk between traces. A ground plane can be a crucial component of a PCB design that can contribute to the overall functionality, reliability, and performance of electronic circuits by providing a solid reference point for electrical signals and mitigating various forms of interference.

Figure 5:
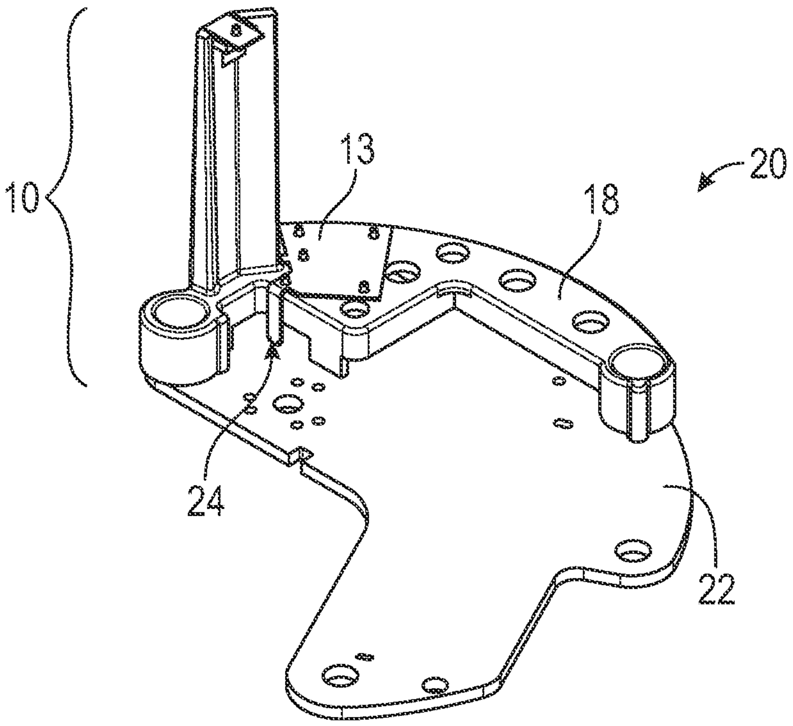
FIG. 5 illustrates a perspective view of the antenna configuration shown in FIG. 4 but with the antenna assembly connected to the printed circuit board, in accordance with an embodiment.

FIG. 5 illustrates a perspective view of the antenna configuration 20 shown in FIG. 4 but with the antenna assembly 18 connected to the printed circuit board 22, in accordance with an embodiment. In FIG. 5 an antenna assembly leg 24 is shown as soldered to the printed circuit board 22.

Figure 6:
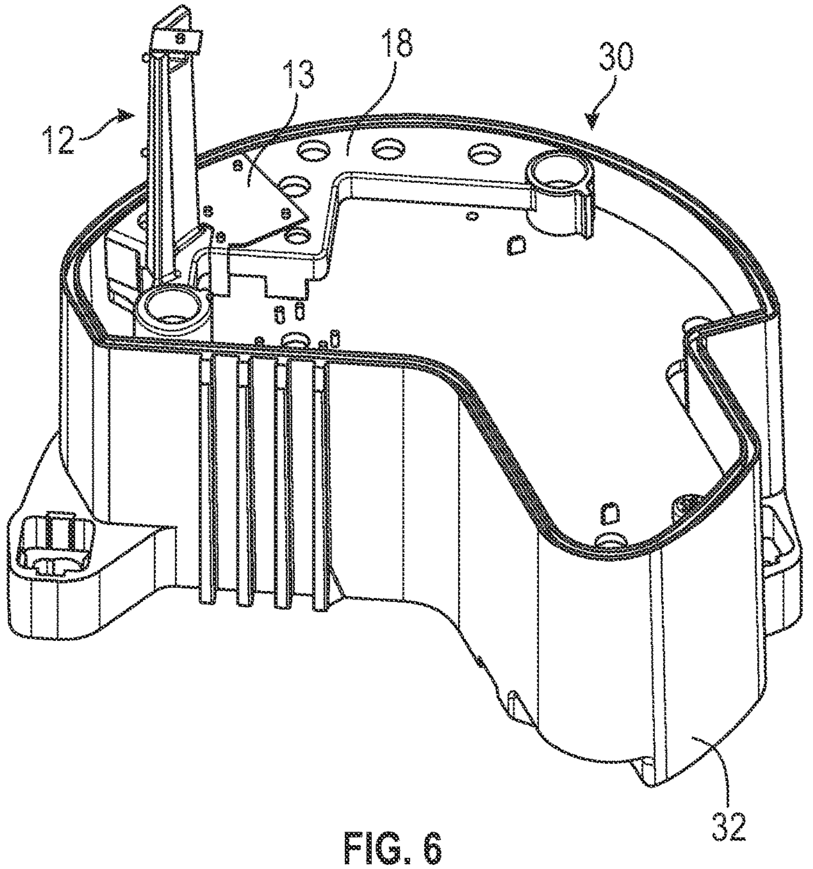
FIG. 6 illustrates a perspective view of a wideband antenna apparatus in accordance with an embodiment.

FIG. 6 illustrates an image of a wideband antenna apparatus 30 that can be implemented in accordance with an embodiment. The wideband antenna apparatus 30 can include the previously discussed antenna assembly 10 including the support 18, the plate 18, and the antenna 12, which can be located and supported within a module 32. The wideband antenna apparatus 30 may implemented in the context of a NBIOT (narrowband Internet-of-Things) module.

Note that the NBIOT (narrowband Internet-of-Things), also referred to by the acronyms NBIoT or NB-IoT relates to a Low Power Wide Area Network (LPWAN) technology that is designed to enable efficient communication for a large number of devices and sensors in the context of the Internet of Things (IoT). The primary focus of NBIOT is to provide long-range communication with low power consumption, making it suitable for applications where devices need to send small amounts of data over long distances while maintaining extended battery life. A discussion of NBIOT technology is disclosed in the document "Narrowband Internet of Things (NB-IoT): From Physical (PHY) and Media Access Control (MAC) Layers Perspectives," by Collins Burton Mwakwata, et al., Sensors 2019, 19, 2613; doi: 10.3390/s19112613, which is incorporated herein by reference in its entirety.

NBIOT devices are designed to operate on very low power, allowing them to have long battery lifetimes. This is crucial for devices that may be deployed in remote locations or places where frequent battery replacement is impractical. NB-IoT technology enables communication over longer distances compared to traditional cellular networks, making it suitable for applications that require coverage in remote or challenging areas.

NBIOT is optimized for transmitting small amounts of data at low data rates. This makes it ideal for applications that involve occasional transmissions of sensor data, such as environmental monitoring, smart agriculture, and asset tracking. NB-IoT signals are designed to penetrate obstacles like walls and buildings more effectively compared to regular cellular signals, ensuring better connectivity in indoor environments and underground structures.

NBIOT can operate within the existing LTE (4G) cellular network infrastructure, utilizing unused portions of the LTE spectrum. This minimizes the need for additional network infrastructure deployment. Since NBIOT leverages existing cellular infrastructure, it can be cost-effective to deploy and maintain. It allows operators to provide IoT services without the need for significant network upgrades.

Like other cellular technologies, NBIOT benefits from the security features inherent to cellular networks, such as encryption and authentication, helping to ensure the confidentiality and integrity of the transmitted data. NBIOT networks can accommodate a large number of connected devices, making it suitable for applications that involve massive deployments of sensors and devices.

In the wideband antenna apparatus 30, the antenna 12 can be implemented as a compact-sized antenna metal structure that can achieve approximately, for example, 18 dBm Total Radiated Power radiation performance for wideband NBIOT (narrowband Internet-of-Things) frequencies. Such wideband NBIOT frequencies can comprise frequencies in a range of approximately 700 MHz to 2100 MHz, covering NBIOT bands B1, B3, B5, B8, B20.

The antenna 12 can employ a metal stamped radiating part (e.g., the plate 13) mounted to the plastic substrate/support 18, which can support the antenna structure to control the antenna radiation performance variation for mass manufacturing. The antenna 12 may have only one feeding point for electrical coupling with RF feeding Port. A feeding leg partial length goes under potting to protect the electronics from water. The feeder leg partial length and radiating element (e.g., plate 13) can be kept above potting material to achieve required radiation performance The antenna mechanical structure of the antenna 12 is unique and polarized in a manner that can achieve the required radiation performance from low frequency to high frequency bands The Antenna assembly 10 is easy to assemble for mass manufacturing as only one point soldering and two screws fixing are required to attach the antenna with the electronic PCB 22. The antenna plastic structure of the wideband antenna apparatus 30 can be designed to support the radiating element to control the variation and to support on the PCB 22 with multiple ribs. This antenna plastic structure can also be designed in a manner that allows for the easy flow of potting material to protect the electronic.

Figure 7:
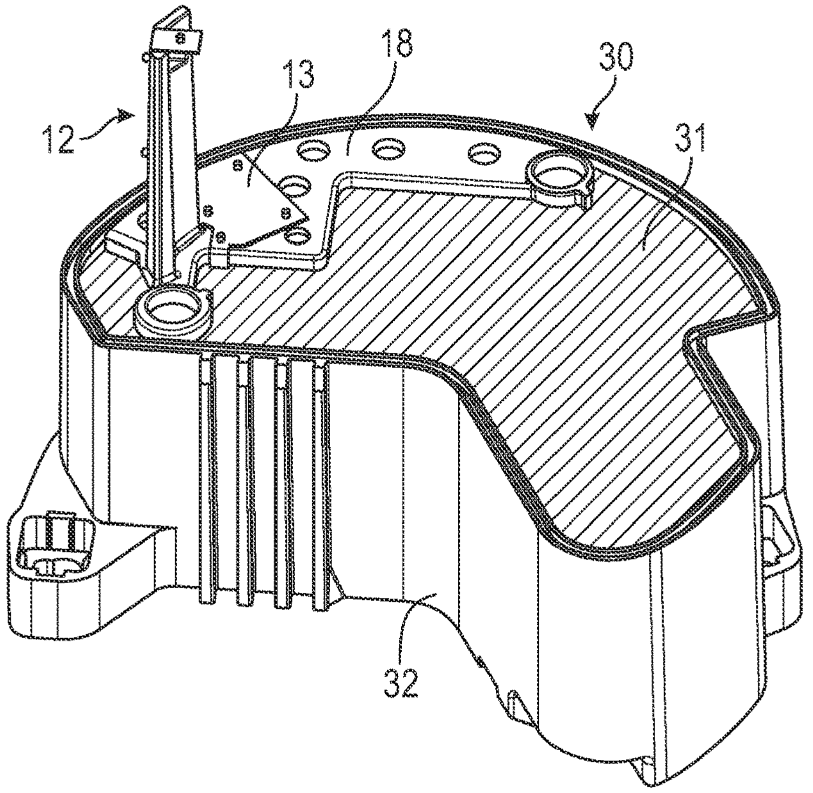
FIG. 7 illustrates a perspective view of a wideband antenna apparatus in accordance with an embodiment.

FIG. 7 illustrates a perspective view of the wideband antenna apparatus 30 shown in FIG. 6, in accordance with an embodiment. In the configuration shown in FIG. 7, a layer 31 is shown, which may be placed above the printed circuit board 22. In the wideband assembly apparatus 30, the antenna 12 can be configured as an antenna metal structure that can achieve, for example, 18 dBm radiation performance for wideband frequencies (700-2100) Mhz. The antenna 12 and the antenna assembly 10 are easy to assembly and manufacture with one soldering point and heat staking. The antenna 12 can be directly soldered to an RF feeding port to eliminate the RF connector performance issues under potting material. The antenna 12 can be partially potted to protect electronics from, for example, a harsh environment, while simultaneously achieving excellent radiation performance.

The antenna 12 may be implemented as an Internet-of-Things antenna, and specifically, an LTE Internet-of Things antenna. Note that an Internet of Things (IoT) antenna is a specialized type of antenna designed for wireless communication between IoT devices and networks. IoT refers to the network of interconnected devices, sensors, and systems that can communicate and exchange data over the internet or other communication networks. These devices can include anything from smart home devices and wearable gadgets to industrial sensors and remote monitoring equipment.

An LTE (Long-Term Evolution) IoT antenna is a specific type of IoT antenna optimized for communication using LTE networks. LTE is a standard for high-speed wireless communication commonly used for mobile data transmission, and it forms the basis for many cellular networks. LTE IoT is a set of standards within the LTE framework that is designed to cater to the unique requirements of IoT devices, such as lower power consumption, longer battery life, and better coverage in challenging environments.

The wideband assembly apparatus 30 can include the use of antenna 12 as an LTE IoT antenna for wideband frequencies, typically from 700 MHz to 2100 MHz with 18 dBm radiation performance, for smart meters (e.g., such as water/gas meters), while controlling the antenna radiation performance variation using a plastic substrate for mass manufacturing. Also, the antenna design can be customized to achieve the required radiation performance with the size constraints of the smart meters.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. A controller may be implemented in hardware or a combination of hardware and software/firmware. The functionality associated with any particular controller may be centralized or distributed, whether locally or remotely.

Based on the foregoing, it can be appreciated that a number of different embodiments, including preferred and alternative embodiments, are disclosed herein. For example, in one embodiment a wideband antenna apparatus can be implemented, which can include a ground plane on a printed circuit board, and a plastic substrate that can support an antenna metal structure of an antenna. The antenna can be part of an antenna assembly that can connect to the printed circuit board. The wideband antenna apparatus may further include a metal radiating element mounted to the plastic substrate with heat staking, and a feeder leg electrically connected to an RF feeder port. The antenna can be connected directly to the RF feeder port and the plastic substrate can control variations in the radiation performance of the antenna due to, for example, manufacturing variations.

In an embodiment, the plastic substrate can comprise one or more of, for example, polycarbonate (PC) and acrylonitrile butadiene styrene (ABS).

In an embodiment, the antenna can be directly soldered to the RF feeder port to eliminate RF connector performance issues with respect to a potting material used to protect the RF connector from harsh environment and facility ease of assembly of the wideband antenna apparatus.

In an embodiment, the antenna can be partially potted to protect electronics from a harsh environment while enhancing a radiation performance with respect to the antenna.

In an embodiment, the antenna can be configured with a compact-sized antenna metal structure that can achieve approximately 18 dBm Total Radiated Power radiation performance for wideband NBIOT (narrowband Internet-of-Things) frequencies.

In an embodiment, the wideband NBIOT frequencies can include frequencies in a range of approximately 700 MHz to 2100 MHz, covering NBIOT bands B1, B3, B5, B8, B20.

In an embodiment, the antenna can be an LTE Internet-of-Things antenna.

In an embodiment, a wideband antenna apparatus can include: a plastic substrate that can support an antenna metal structure of an antenna, wherein the antenna is part of an antenna assembly; a metal radiating element mounted to the plastic substrate with heat staking; and a feeder leg electrically connected to an RF feeder port, wherein the antenna can be connected directly to the RF feeder port and the plastic substrate controls variations in a radiation performance of the antenna due to manufacturing variations.

In an embodiment, a method of operating a wideband antenna apparatus, can involve controlling with a plastic substrate, variations in a radiation performance of an antenna. The plastic substrate can support an antenna metal structure that includes the antenna. The antenna can be part of an antenna assembly and a metal radiating element can be mounted to the plastic substrate with heat staking. In this method, a feeder leg can be electrically connected to an RF feeder port, and the antenna can be connected directly to the RF feeder port. The antenna can be directly soldered to the RF feeder port to eliminate RF connector performance issues with respect to a potting material used to protect the RF connector from harsh environment and facility ease of assembly of the wideband antenna apparatus. In this method, the antenna can be a compact-sized antenna metal structure that achieves approximately 18 dBm Total Radiated Power radiation performance for wideband NBIOT (narrowband Internet-of-Things) frequencies. The antenna may be an LTE Internet-of-Things antenna.

It will be appreciated that variations of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art which are also intended to be encompassed by the following claims.

What is claimed is:

1. A wideband antenna apparatus, comprising:
- a printed circuit board with a ground plane disposed on the printed circuit board; and
- an antenna assembly connected to the printed circuit board, wherein the antenna assembly comprises:
  - an antenna having an antenna metal structure comprising a feeder leg and a metal radiating element, wherein the antenna is connected directly to an RF feeder port through the feeder leg; and
  - a plastic substrate configured to:
    - support the antenna metal structure; and
    - control variations in a radiation performance of the antenna, wherein the metal radiating element is mounted on the plastic substrate with heat staking.

2. The wideband antenna apparatus of claim 1, wherein the plastic substrate comprises at least one of: polycarbonate (PC) and acrylonitrile butadiene styrene (ABS).

3. The wideband antenna apparatus of claim 1, wherein the antenna is directly soldered to the RF feeder port.

4. The wideband antenna apparatus of claim 1, wherein the antenna is partially potted.

5. The wideband antenna apparatus of claim 1, wherein the antenna metal structure of the antenna is configured to operate at narrowband Internet-of Things (NBIOT) frequencies.

6. The wideband antenna apparatus of claim 5, wherein the wideband NBIOT frequencies comprise frequencies in a range of 700 MHz to 2100 MHz.

7. The wideband antenna apparatus of claim 1, wherein the antenna corresponds to an LTE Internet-of-Things antenna.

8. A wideband antenna apparatus, comprising:
- an antenna having an antenna metal structure comprising a feeder leg and a metal radiating element, wherein the antenna is connected directly to an RF feeder port through the feeder leg; and
- a plastic substrate configured to:
  - support the antenna metal structure; and
  - control variations in a radiation performance of the antenna, wherein the metal radiating element is mounted on the plastic substrate with heat staking.

9. The wideband antenna apparatus of claim 8, wherein the plastic substrate comprises at least one of: polycarbonate (PC) and acrylonitrile butadiene styrene (ABS).

10. The wideband antenna apparatus of claim 8, wherein the antenna is directly soldered to the RF feeder port.

11. The wideband antenna apparatus of claim 8, wherein the antenna is partially potted.

12. The wideband antenna apparatus of claim 8, wherein the antenna metal structure of the antenna is configured to operate at narrowband Internet-of-Things (NBIOT) frequencies.

13. The wideband antenna apparatus of claim 12, wherein the wideband NBIOT frequencies comprise frequencies in a range of 700 MHz to 2100 MHz.

14. The wideband antenna apparatus of claim 8, wherein the antenna corresponds to an LTE Internet-of-Things antenna.

15. A method of operating a wideband antenna apparatus, comprising:
- controlling with a plastic substrate, variations in a radiation performance of an antenna, wherein:
  - the antenna having an antenna metal structure comprising a feeder leg and a metal radiating element,
  - the antenna is connected directly to an RF feeder port through the feeder leg,
  - the plastic substrate supports the antenna metal structure of the antenna, and
  - the metal radiating element is mounted on the plastic substrate with heat staking.

16. The method of claim 15, wherein the antenna is directly soldered to the RF feeder port.

17. The method of claim 15, wherein the antenna metal structure of the antenna is configured to operate at narrowband Internet-of-Things (NBIOT) frequencies.

18. The method of claim 15, wherein the antenna corresponds to an LTE Internet-of-Things antenna.

* * * * *